United States Patent [19]

Akse

[11] Patent Number: 4,571,276

[45] Date of Patent: Feb. 18, 1986

[54] METHOD FOR STRENGTHENING TERMINATIONS ON REDUCTION FIRED MULTILAYER CAPACITORS

[75] Inventor: James R. Akse, Canyon Country, Calif.

[73] Assignee: North American Philips Corporation, New York, N.Y.

[21] Appl. No.: 623,597

[22] Filed: Jun. 22, 1984

[51] Int. Cl.[4] ............................................. C03B 29/00
[52] U.S. Cl. ...................................... 156/89; 361/306; 361/308; 361/309; 361/320; 361/321; 501/11; 501/41; 501/53
[58] Field of Search ................. 156/89; 29/25.41, 857, 29/874, 877, 884; 361/306, 308, 309, 320, 321; 501/11, 41, 53, 65, 77, 78, 49, 50, 51

[56] References Cited

U.S. PATENT DOCUMENTS

| | | | |
|---|---|---|---|
| 3,235,939 | 2/1966 | Rodriquez et al. | 156/89 |
| 3,378,704 | 4/1968 | Miller et al. | 156/89 |
| 3,604,082 | 9/1971 | McBrayer et al. | 156/89 |
| 3,809,973 | 5/1974 | Hurley | 361/309 |
| 4,223,369 | 9/1980 | Burn | 361/320 |
| 4,383,985 | 6/1983 | Dirstine | 156/89 |
| 4,475,967 | 10/1984 | Kanai et al. | 156/89 |

*Primary Examiner*—Caleb Weston
*Attorney, Agent, or Firm*—Norman N. Spain

[57] ABSTRACT

The strength of end terminations on multilayer capacitors employing base metal electrodes is increased by heating the terminations, subsequent to firing in a reducing atmosphere, in an atmosphere in which the oxygen partial pressure is at least equal to that of air for a period of at least 15 minutes at a temperature of 375° C.–600° C.

11 Claims, No Drawings

METHOD FOR STRENGTHENING TERMINATIONS ON REDUCTION FIRED MULTILAYER CAPACITORS

BACKGROUND OF THE INVENTION

The instant invention involves a method of producing multilayer capacitors provided with end terminations. In particular this invention relates to a method of producing base metal electrode multilayer capacitors having metallized end terminations of increased strength.

As shown in H. J. Hagemann et al, *Philips Tech. Rev.* 41, 89-98, 1983/84, No. 3, a multilayer capacitor consists of a ceramic body in which there are embedded electrode layers and which electrode layers are alternately connected to metallized end terminations on opposite faces of the capacitor. Through this arrangement, the individual capacitors formed by ceramic layers between the electrodes are all connected in parallel. As a result, the capacitance adds up so that these capacitors can be made with a high capacitance per unit volume.

Due to the presence of the metallized end terminations at the faces of the ceramic bodies, these capacitors function as "chip components" which can be soldered directly to the conducting paths of a printed circuit board and are particularly adapted for automatic mounting in printed circuit boards.

As described in the Hagemann et al article the manufacture of the multilayer capacitors is as follows: A ceramic dielectric material, particularly a barium titanate or a modified barium titanate, is mixed with a binder to form a suspension. Strips or tapes are cast from the suspension. The strips or tapes are then cut into sheets and a metal paste is applied onto the sheets, in a repetitive pattern, by screen printing. The sheets with the resultant printed electrodes on them are stacked so that the screen printed metal layers are interposed between layers of the ceramic material and the stacked sheets are consolidated under pressure. Individual consolidated units are then cut apart, heated to burn off the binder, and fired to produce a coherent integral structure of ceramic and metal.

During the screening, stacking and cutting procedures, the sheets are aligned so that the edges of the electrodes alternatively extend to two opposite faces of the unit. These two faces are then metallized as a result of which the individual ceramic capacitors in each integral stack are all connected in parallel.

As is further pointed out in this article, the dielectric ceramics generally employed normally require firing in air at temperatures between 1200° C. and 1400° C. As a result, only nonoxidizing metals having a high melting point are useful as the electrodes of these multilayer capacitors. In practice these metals are limited to the very expensive metals palladium gold or platinum and their silver alloys. As a result of this, these capacitors are very costly and cannot be readily used as components in an automatic chip mounting system and in particularly in mass produced consumer articles. To overcome this problem this article suggests the use of a base metal, particularly nickel, for the electrodes.

However, use of a nickel electrode is not suitable under normal firing conditions as such firing conditions cause oxidation of the nickel resulting in undesired reactions between the nickel oxide and the ceramic materials as well as loss of electrical integrity. As a result of such reactions there is a strong tendency for delamination of the multilayer structure to occur. To prevent this oxidation, this firing is carried out in an atmosphere that is sufficiently reducing to prevent oxidation of the nickel.

However, as a result of the use of the reducing atmosphere, the barium titanate which is generally used as a ceramic material becomes semiconducting due to the loss of oxygen. To overcome this, acceptor-type dopants are added to the barium titanate. In particular ions of the transition metals Cr, Fe, Ga, Mn, and Ni are employed.

Conventionally, end terminations are formed by dipping the fired part in a paste consisting of a well dispersed mixture of silver, glass frit, and an organic binder and solvent mixture. The dipped parts are then dried and fired in air at a temperature in excess of 750° C. The high temperature firing is required to provide a proper densification of the silver paste, adherence of the glass of the paste to the ceramic and to provide a good electric contact between the nickel electrodes and the terminations.

However, the firing at a high temperature in an oxidizing atmosphere, causes a certain amount of oxidation of the nickel electrodes. As a result capacitance is lost and the dissipation factor increases. Alternative terminations which are fired under reducing conditions prevent nickel oxidation, however, because the glasses used cannot contain reducable oxides such as $Bi_2O_3$, PbO, or CdO, the strength of such terminations is low.

In an attempt to overcome this problem, Hurley U.S. Pat. No. 3,809,973 proposes the use of a thin film of gold on the faces having exposed nickel electrode edges before applying a silver paste to these faces and then heating the body in air to about 800° C. Due to the presence of the gold layer, oxidation of the nickel electrode is inhibited. However, while the method of this patent solves the problem of the oxidation of the nickel electrodes, use of the expensive gold and elaborate processing requirements inhibit commercial use of this method particularly for production of multilayer capacitors for consumer products.

It is therefore an object of the instant invention to provide a less expensive method of increasing the strengths of the end metallizations of base metal electrode multilayer capacitors.

This and other objects of the invention will be apparent from the description that follows.

SUMMARY OF THE INVENTION

According to the invention a novel method is provided for producing base metal electrode multilayer capacitors having end metallizations.

The method of the invention comprises the following novel combination:

A body containing a plurality of alternate layers of a reduction resistant ceramic dielectric material and electrode layers is formed. The electrode layers are composed of a base metal such as nickel, cobalt, iron, copper and alloys of these metals. The electrode layers are sandwiched between layers of the ceramic dielectric material and are positioned so that they alternatively extend to, and have edges exposed at, opposite faces.

The resultant green body is then processed to the fired state by the method as described in Dirstine U.S. Pat. No. 4,386,985, the contents of which are hereby incorporated by reference.

According to this method, firing is carried out at a temperature of from about 1200° C. to about 1425° C. in an atmosphere having an oxygen partial pressure of between approximately $10^{-11}$ atmospheres and that which is at least reducing to the electrode metals.

Green end terminations are then applied to the faces of the fired body containing the extensions of the electrode layers, for example by dipping these faces in a paste consisting of a well dispersed mixture of a noble metal, glass frit, organic binder and organic solvent. Alternatively the green end terminations can be applied by screen printing.

The resultant green end terminations are then dried in air at a low temperature. The body is then heated in air at a temperature of about 300° C. to 500° C. to remove the organic solvents and vehicles from the terminations.

After this heating step, the body is then heated to a temperature of from 700° C. to 950° C. in an atmosphere which is reducing to the electrode material. This step densifies the terminations, electrically connects the terminations to the electrode layers, and bonds the glass of the terminations to the ceramic.

After heating in the reducing atmosphere the body is heated additionally for at least 15 minutes at a temperature of 375° C. to 600° C. in an atmosphere having an oxygen partial pressure equal to or greater than air. As a result of this additional heating step the strength of the end terminations are greatly increased while no oxidation of the base metal electrodes takes place.

The instant method not only provides an increase of the strength of the end terminations to the faces of the body, as does the method of the Hurley patent, but has the advantage of not requiring the use of expensive gold layers. Thus, this method greatly decreases the production cost of the capacitors and makes them eminently suitable for use as chip components in consumer products.

DESCRIPTION OF THE PREFERRED EMBODIMENTS

While not strictly necessary it has been found that it is generally useful for the reducing atmosphere to essentially of a mixture of hydrogen, nitrogen, and water vapor with a partial pressure of oxygen small enough so as to avoid oxidation of the electrode layers. When silver is employed as the metal in the end terminations the preferred firing range is from 850° C. to 875° C.

Preferably, the firing of the bodies subsequent to the firing in the reducing atmosphere is carried out in air, more preferably at a temperature of about 425° C. when the metal of the electrode is nickel and the noble metal of the end terminations is silver.

Preferred examples of glass materials are either the $BaO—Al_2O_3—B_2O_3$ or the $Na_2O—B_2O_3—SiO_2$ system. In the former CaO or MgO may be substituted for BaO, $SiO_2$, $Na_2O$ or $K_2O$ may be substituted for $B_2O_3$, and NiO, CuO or FeO may be substituted for $Al_2O_3$. In the latter CaO, BaO, MgO, $K_2O$ may be substituted for $Na_2O$.

Any reduction resistant ceramic dielectric material may be employed, examples of which are barium titanate, strontium titanate and aluminum oxide.

A preferred ceramic dielectric material that may be employed consists essentially of a barium titanate formed in a major amount of approximately equal proportions of BaO and $TiO_2$, minor amounts of CaO and $ZrO_2$ sufficient to shift and broaden the Curie peaks of the ceramic to a preselected value and magnesium oxide in an amount of about 1 mole % of the ceramic material and where the ratio of the large to small cations in less than or equal to 0.98 but greater than or equal to 0.89. Large and small cations are defined respectively as those having ionic radii greater or less than 0.90.

Particularly good results are achieved when the electrodes are formed of nickel and the ceramic dielectric material consists essentially in mole percent or 44–46% BaO, 44–46% $TiO_2$, 2.5–3.0% CaO, 2.5–3.0% MgO, 2.5–3.0% $ZiO_2$ and 1.25–1.75% NiO.

Specific examples of preferred ceramic dielectric compositions are those described in Dirstine U.S. Pat. No. 4,386,985 particularly that disclosed in Example 1 thereof.

For a more complete understanding, the invention will now be described in greater detail with reference to the following example.

EXAMPLE 1

Following the procedure of Example 1 of U.S. Pat. No. 4,386,985, a composition comprising the following compounds in the proportions indicated by mol. % was prepared: 45.01% BaO (as $BaCO_3$), 2.77% CaO (as $CaCo_3$), 45.17% $TiO_2$, 2.77% MgO (as $MgCO_3$), 2.77% $ZrO_2$ and 1.51% NiO. These components, which were all of high purity grades, were ultimately mixed by vibratory milling for 1 hour and subsequently dried. The resultant mixture was then calcined for 16 hours at 1050° C.–1100° C. and crushed to pass a 60 mesh sieve. The resultant powder was then mixed with an organic binder in a solvent such as butyl cellusolve acetate. The resultant slurry was milled for about 12 hours and cast into a 35 micron thick tape by use of a doctor blade technique.

A 5 micron thick nickel electrode was then screened on the tape in such a manner that only one end of the nickel electrode extended to an end of the ceramic tape.

Multiples of screen and unscreened tapes were assembled in stacks in such a manner that the two outer surfaces of the stacks were formed of the ceramic material and the ends of the electrodes were alternatively exposed at opposite end faces of the stacks.

These stacks were then pressed to form green laminated bodies.

After being subjected to a low temperature firing in air to remove all the organic components, the green laminated bodies were fired at 1350° C. in a reducing atmosphere, said atmosphere being a mixture of hydrogen, nitrogen and water vapor in which the logarithm of the partial pressure of oxygen was $-16.85$ when measured at 750° C. A metallization paste comprising a well dispersed mixture of silver, a nonreducable glass such as $K_2O$ 2.3%, $Na_2O$ 15.3%, CaO 6.3%, $Al_2O_3$ 3.7%, $B_2O_3$ 2.6% and $S_iO_2$ 69.8%, and an organic solvent-vehicle mixture was applied to the two end faces of the fired laminated body. The laminates were then dried at room temperature to remove the solvent and then heated in air at a peak temperature of about 300° C. to 500° C., the temperature rising to the peak in 3 hours and being held at the peak temperature for about 30 minutes. By this heating process the organic solvents and vehicles were removed from the terminations.

The terminations were then fired at a peak temperature of 850° to 875° C. in a reducing atmosphere formed by a mixture of hydrogen, nitrogen and water vapor in which the logarithm of the partial pressure of oxygen was $-16.85$ when measured at 750° C. The maximum firing temperature of 850° to 875° C. was maintained for about ten minutes.

After being allowed to cool to room temperature, the resultant monolithic capacitor was then further heated in air at a peak temperature of 425° C., the capacitor being heated to the peak temperature in 3 hours and being held at the peak temperature for about 30 minutes.

In order to demonstrate the effect on the strengths of the bonds of the end terminations to the capacitors by the final firing in air, axial pull tests were applied to leads which were soldered to the end terminations before and after the final firing in air. The amount of axial force that was found necessary to cause detachment of the end terminations from the capacitors was then determined and is shown in the following table:

TABLE

| Size of Capacitor | Glass* | End Termination Strength Before | After |
|---|---|---|---|
| 4.5 × 1.0 × 5.5 mm | A | 2.64 Kg | 6.55 Kg |
| same | B | 2.23 Kg | 5.14 Kg |
| 1.3 × 0.75 × 3.0 mm | B | 0.73 Kg | 4.23 Kg |

| Glass A: | $K_2O$ | $Na_2O$ | CaO | $Al_2O_3$ | $BaO_3$ | $SiO_2$ |
|---|---|---|---|---|---|---|
| | 2.3 | 15.3 | 6.3 | 3.7 | 2.6 | 69.8 w/o |
| Glass B: | BaO | $Na_2O$ | $Al_2O_3$ | $B_2O_3$ | | |
| | 60.0 | 1.5 | 5.0 | 33.5 w/o | | |

*Glass = glass in metallization

What I claim is:

1. A method of producing base metal electrode multilayer capacitors having end terminations of increased strength, said method comprising the steps of:
   (a) forming a body of a plurality of alternate layers of a reduction resistant ceramic dielectric material and electrode layers, said electrode layers consisting of a paste of a base metal selected from the group consisting of nickel, cobalt, iron and copper and alloys thereof, dispersed in a solution of an organic vehicle dissolved in an organic solvent, each of said electrode layers being sandwiched between layers of said ceramic dielectric material and having edges alternatively exposed at opposite faces of said body;
   (b) firing said body first in air at low temperature to remove all organic residue, and then in an atmospheres reducing to the base metal of the electrode layer at a high temperature;
   (c) applying to each face of said fired body having exposed electrode edges, end terminations consisting of a coating of a conductive paste comprising a noble metal and a reduction-resistant glass, in an amount of less than 15% by volume of the noble metal, dispersed in a solution of an organic vehicle in an organic solvent;
   (d) heating said end terminations in air at a temperature of 300° C.-500° C. to remove all organic residue from said end terminations;
   (e) heating said end terminations at a temperature of from 700° C.-950° C. in a reducing atmosphere having an oxygen partial pressure not in excess of that which is reducing for said electrode layers for a time sufficient to sinter the terminations to form adherent bonds between the glass of said terminations and said ceramic dielectric material, and to form adherent and electrically conductive bonds between the metal of said termination and said electrode layers;
   (f) and then heating said end terminations for at least 15 minutes at a temperature of 375° C.-600° C. in an atmosphere in which the oxygen of partial pressure is at least equal to that of air thereby increasing the strength of said end terminations.

2. The method of claim 1 wherein the reduction resistant glass is a $BaO-B_2O_3-Al_2O_3$ glass wherein the BaO may be substituted in part by CaO or MgO, the $B_2O_3$ may be substituted in part by $Na_2O$ or $K_2O$ and the $Al_2O_3$ may be substituted in part by NiO, CuO or FeO.

3. The method of claim 1 wherein the reduction resistant glass is a $SiO_2-B_2O_3-Na_2O$ glass wherein the $Na_2O$ may be substituted in part by CaO, BaO, MgO or $K_2O$.

4. The method of claim 2 wherein the reducing atmosphere consists essentially of a mixture of hydrogen, nitrogen and water vapor and a partial pressure of oxygen small enough so as to avoid oxidation of said electrode layers.

5. The method of claim 3 wherein the reducing atmosphere consists essentially of a mixture of hydrogen, nitrogen and water vapor and a partial pressure of oxygen small enough so as to avoid oxidation of said electrode layers.

6. The method of claim 1 wherein the ceramic dielectric material is selected from the group consisting of barium titanates, strontium titanates and aluminum oxides.

7. The method of claim 6 wherein the base metal of the electrode layer is nickel, the noble metal is silver and the heating in the reducing atmosphere is carried out at a temperature of 850° C.-875° C.

8. The method of claim 7 wherein the heating step, subsequent to the heating in the reducing atmosphere, is carried out at a temperature of about 425° C. in air for about 30 minutes.

9. The method of claim 8 wherein the ceramic dielectric material consists essentially of a major amount of BaO and $TiO_2$ in approximately equal proportions, minor amounts of CaO and $TiO_2$ but sufficient to shift and broaden the Curie peak of the ceramic material to a preselected value, MgO in an amount of at least 1 mole % of the ceramic material and wherein the large to small cation ratio of the ceramic material is less than or equal to 0.98 but greater than or equal to 0.89.

10. The method of claim 9 wherein the dielectric ceramic material consists essentially, in mole percent, of 44–46% BaO, 44–46% of $TiO_2$, 2.5–3.0% CaO, 2.5–3.0% MgO, 2.5–3.0% $ZrO_2$ and 1.25–1.75% NiO.

11. The method of claim 3, wherein the $SiO_2-B_2O_3-Na_2O$ glass contains $K_2O$, CaO and $Al_2O_3$.

* * * * *